(12) United States Patent
Kirchhoff

(10) Patent No.: US 7,703,211 B1
(45) Date of Patent: Apr. 27, 2010

(54) EASY LIFT SAW PLATFORM

(76) Inventor: Robert W. Kirchhoff, 1N615 Ingalton, West Chicago, IL (US) 60185

( * ) Notice: Subject to any disclaimer, the term of this patent is extended or adjusted under 35 U.S.C. 154(b) by 246 days.

(21) Appl. No.: 11/809,928

(22) Filed: Jun. 4, 2007

(51) Int. Cl.
*B26B 27/00* (2006.01)
*A10G 23/08* (2006.01)
*F16F 15/00* (2006.01)

(52) U.S. Cl. .................... 30/296.1; 30/297; 30/379; 56/233

(58) Field of Classification Search ............... 30/296.1, 30/297, 290, 293, 276, 381–387, 273, 275.4, 30/520–521; 56/233, 16.7, 17.1, 17.6, 234–238
See application file for complete search history.

(56) References Cited

U.S. PATENT DOCUMENTS

| | | | | |
|---|---|---|---|---|
| 1,890,696 A | * | 12/1932 | Rosenhahn | 482/90 |
| 2,212,430 A | * | 8/1940 | Zimmerman | 56/233 |
| 2,405,110 A | * | 8/1946 | Bullock | 173/141 |
| 2,504,856 A | * | 4/1950 | Luplow | 47/1.01 R |
| 2,580,831 A | * | 1/1952 | Persak, Jr. | 30/248 |
| 2,762,186 A | * | 9/1956 | Janata | 56/233 |
| 2,879,677 A | * | 3/1959 | Baublitz | 173/141 |
| 4,044,979 A | * | 8/1977 | Lemmo | 248/647 |
| 4,736,804 A | * | 4/1988 | Geibel | 173/30 |
| 5,001,858 A | | 3/1991 | Frazar | |
| 5,107,594 A | * | 4/1992 | Ferreras | 30/372 |
| RE34,358 E | | 8/1993 | Miller | |
| 5,295,620 A | * | 3/1994 | Cousineau et al. | 227/156 |
| 5,322,102 A | * | 6/1994 | Livingston | 144/24.13 |
| 5,718,050 A | | 2/1998 | Keller et al. | |
| 5,979,518 A | * | 11/1999 | Hamby | 144/34.1 |
| 6,095,724 A | * | 8/2000 | Hurt | 408/136 |
| 6,715,272 B2 | * | 4/2004 | Stahl | 56/233 |
| 2003/0140507 A1 | * | 7/2003 | Lagaly et al. | 30/392 |
| 2003/0188441 A1 | * | 10/2003 | Patton | 30/381 |
| 2004/0255471 A1 | * | 12/2004 | Black | 30/296.1 |

* cited by examiner

*Primary Examiner*—Ghassem Alie

(57) ABSTRACT

An extendable tree trimming saw is made easy to handle by providing a foot plate on which to rest the weight of the pole and a winch for raising and lowering the saw. The extendable pole is pivotally connected to the foot plate, preferably through a coil spring or elastomeric mass that aides in holding the pole upright and restoring it to an upright position after a cutting operation.

4 Claims, 1 Drawing Sheet

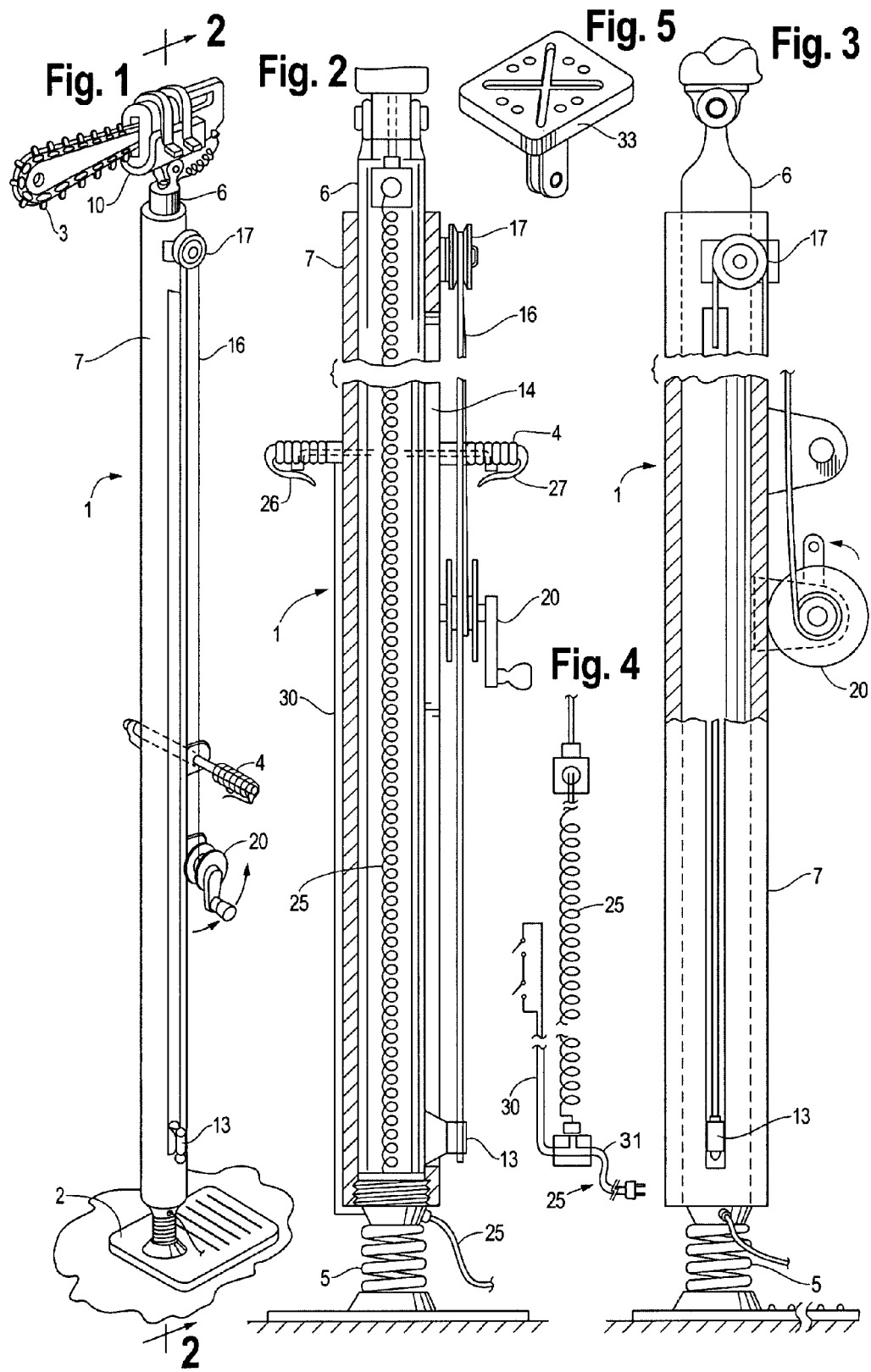

EASY LIFT SAW PLATFORM

BACKGROUND OF THE INVENTION

This invention relates to extendable saws for trimming and pruning trees and similar tasks. Extendable power saws have in general been quite unwieldy, typically requiring an operator to maneuver a heavy chainsaw from the end of a pole. Other types have power units at one end of a pole connected to a saw blade at the other end through internal shafts and gears and are complex and expensive in addition to being unwieldy. The present invention provides for easy lifting and maneuvering of an extendable pruning saw.

SUMMARY OF THE INVENTION

A foot plate provides a secure base for an extendable pole mounted pruning saw. The pole is pivotally connected to the foot plate so that the weight of the heavy saw is taken by the foot plate while the operator easily guides the pole though various angles to effect a cut. The pole is connected to the foot plate preferably through a restoring means such as a coil spring or elastomeric mass that helps the operator to hold and restore the pole to an upright position. A winch or other lifting device may be employed to help the operator raise and lower the pruning saw.

DESCRIPTION OF THE DRAWINGS

FIG. 1 shows the invention in perspective.

FIG. 2 is sectional view of the invention taken along 2-2 of FIG. 1.

FIG. 3 is a partially cutaway view of the invention from the side.

FIG. 4 is a semi-schematic diagram showing electrical wiring with safety deadman switches.

FIG. 5 shows a universal tool mounting attachment for the invention.

DETAILED DESCRIPTION OF THE INVENTION

Referring to FIG. 1, extendable tube 1 is pivotally connected to foot plate 2 so that the tube can be pushed, pulled, or maneuvered to any angle in order to position the blade of the chainsaw 3 next to a branch or the like to effect a cutting operation. The chainsaw may be a standalone model with handles that can be used independently of the present invention secured in a holder 10 that is preferably pivotally connected to the top of inner tube 6 in order to employ various blade angles for a cut, as pictured in FIG. 1, or a handleless version specifically designed for direct attachment to the pole. A handlebar 4 may be affixed to the extendable pole as an aide to maneuvering this pole 1. An electrically powered chainsaw 3 is preferred for cutting tree branches, but other types of saws or power tools can be employed for this or other applications where hard to reach items are to be cut or otherwise machined. The foot plate 2 is held in place by the operator's weight.

Various means to pivotally connect the foot plate to the extendable tube could be employed, such as a ball and socket joint; but it is desirable that the angular motion of the pole be constrained as the device would be top heavy from the weight of a chainsaw and have a tendency to topple if leaned too far. A preferred connector would be the coil spring 5 of FIGS. 2 and 3, which connects the bottom end of the extendable pole 1 to the foot plate. This spring would help to maintain the pole in an upright position and also help to restore the pole to an upright position after a cutting operation. Another possibility would be to embed the pole in a mass or block of elastomeric material fixed to the foot plate. This likewise would constrain angular lean of the pole and provide a force to restore the pole to the upright position. Yet another possibility would be a bendable rod of springlike material.

Virtually any kind of extendable pole capable of holding a saw could be used to practice the invention. Referring to FIGS. 1, 2, and 3, a preferred embodiment employs an inner tube 6 that slides up and down in an outer tube 7. A guide key 13 attached to and extending from the inner tube passes through the outer tube 7, this tube having a long longitudinal slot 14 (FIG. 2) cut through the outer tube 7. This guide key 13 also serves as a point of attachment for cable 16, which passes over pulley 17 mounted near the top of the outer tube and is then wound or unwound on winch 20 to raise or lower the inner tube 6. Other means could be employed to extend pole 1, such as a hand-cranked or motorized rack and pinion arrangement.

For neatness and to prevent tripping accidents, some degree of cord control is desirable. In FIG. 2 this is accomplished by running a coiled extension cord 25 up though the insides of tubes 6 and 7. Another possibility would be a self-rewinding cord reel attached to the outside of pole 1. Due to the dangerous nature of chainsaws, a deadman switch should be provided to cut off power to the saw in the event the operator loses control of the device, or even one for each hand as in FIG. 2, where deadman switches 26 and 27 enable switching off power if the operator loses his grip on even one side of the handlebar 4. This can be accomplished, for example, referring to FIGS. 2 and 4, by running part of the coiled extension cord 30 up alongside outer tube 7 (FIG. 2), through the deadman switches 26 and 27 in series, and back to the coiled extension cord 25, as shown schematically in FIG. 4.

FIG. 5 shows a universal tool holder 33 with various holes and slots that can be used to attach other tools or tool holders to the extendable pole 1 for applications of the invention other than tree trimming, such as drilling, routing, paint spraying, etc.

I claim:

1. A lift saw platform that comprises:
    an extendable pole, said pole comprising an outer tube having a guide slot cut lengthwise through its sides, an inner tube that slides up and down in the outer tube, and a guide key that extends from near the lower end of the inner tube through the guide slot in the outer tube, this said guide key serving also as a point of attachment for a winch cable, said cable passing over a pulley mounted to the top of the outer tube and then proceeding to a winch mounted on the outer tube at a point convenient for the operator, manipulation of said winch raises or lowers the inner tube;
    a chainsaw mounted to the top end of the extendable pole;
    a foot plate which is held in place by the operator's weight to secure the device during the operation;
    a coil spring, elastomeric mass, or bendable springlike rod that pivotally connects the bottom end of the extendable pole to the foot plate, enabling the operator to easily adjust the pole to bear against a tree branch as well as helping to maintain the pole in an upright position and restore the pole to an upright position after a cut; and
    a horizontal bar handle attached to the outer tube for easy manipulation of the extendable pole in various directions while providing in conjunction with the foot plate a very secure and safe method of controlling the chainsaw by providing a grip for each hand.

2. The lift saw platform of claim 1, wherein the chainsaw is electrically powered, and further comprising at least one deadman switch on the horizontal bar handle for automatically cutting off power to the saw should the operator lose control of the device.

3. The lift saw platform of claim 1, wherein the chainsaw is electrically powered, and wherein the power for the saw is taken from a coiled extension cord passing internally through the extendable tube, or from a self-rewinding cord reel mounted on the outer tube.

4. The lift saw platform of claim 1, further comprising a universal tool holder that can be attached to the top of the extendable pole.

\* \* \* \* \*